(12) United States Patent
Bosen

(10) Patent No.: US 6,948,320 B2
(45) Date of Patent: Sep. 27, 2005

(54) EXPANSION TURBINE STAGE

(75) Inventor: Werner Bosen, Köln (DE)

(73) Assignee: Atlas Copco Energas GmbH, Köln (DE)

( * ) Notice: Subject to any disclaimer, the term of this patent is extended or adjusted under 35 U.S.C. 154(b) by 0 days.

(21) Appl. No.: 10/779,028

(22) Filed: Feb. 13, 2004

(65) Prior Publication Data

US 2004/0216466 A1 Nov. 4, 2004

(30) Foreign Application Priority Data

Mar. 12, 2003 (DE) .......................... 103 10 678

(51) Int. Cl.$^7$ ................................................ F02C 3/04
(52) U.S. Cl. .......................... 60/805; 415/203; 60/799; 60/722
(58) Field of Search ................. 60/805, 799, 722; 415/203, 211.2, 177, 178

(56) References Cited

U.S. PATENT DOCUMENTS

| | | | | |
|---|---|---|---|---|
| 2,911,138 A | * | 11/1959 | Birmann | 230/116 |
| 3,093,084 A | * | 6/1963 | Derderian | 103/87 |
| 3,173,241 A | * | 3/1965 | Birmann | 60/13 |
| 3,478,955 A | * | 11/1969 | Kunderman | 417/507 |
| 3,761,205 A | * | 9/1973 | Cronstedt | 417/407 |
| 3,802,187 A | * | 4/1974 | Titus | 60/39.5 |
| 4,149,832 A | * | 4/1979 | Sivolap et al. | 417/409 |
| 4,499,731 A | * | 2/1985 | Moser | 60/602 |
| 4,571,154 A | * | 2/1986 | Weber | 415/158 |
| 4,935,656 A | * | 6/1990 | Kawamura | 310/156.08 |
| 5,133,638 A | * | 7/1992 | Mosure | 415/168.1 |
| 5,233,824 A | * | 8/1993 | Clevenger | 60/805 |
| 5,870,894 A | * | 2/1999 | Woollenweber et al. | 60/607 |
| 6,287,094 B1 | * | 9/2001 | Bleitz et al. | 417/440 |
| 6,449,950 B1 | * | 9/2002 | Allen et al. | 60/607 |
| 6,510,684 B2 | * | 1/2003 | Matsunaga | 60/39.511 |
| 6,589,015 B1 | * | 7/2003 | Roberts et al. | 415/208.3 |
| 6,651,431 B1 | * | 11/2003 | Yang et al. | 60/605.1 |
| 6,659,737 B2 | * | 12/2003 | Bader et al. | 417/366 |
| 6,668,553 B1 | * | 12/2003 | Ghizawi | 60/605.3 |
| 6,736,589 B2 | * | 5/2004 | Sichera et al. | 414/737 |
| 6,767,185 B2 | * | 7/2004 | Martin et al. | 415/205 |

* cited by examiner

Primary Examiner—William H. Rodriguez
(74) Attorney, Agent, or Firm—Collard & Roe, P.C.

(57) ABSTRACT

An expansion turbine stage for compressed gases has a housing and a turbine rotor. The housing has flow guide channels for feeding the compressed gas to the turbine rotor. The turbine rotor, which is over-mounted and has centripetal flow through it, is followed by an out-flow diffuser enclosed by the housing, to delay the cold expanded gas. The out-flow diffuser is arranged in a holder bore in the housing, as a separate component. For thermal insulation of the housing relative to the cold expanded gas stream, the out-flow diffuser is made of a non-metallic material having a low heat conductivity.

3 Claims, 1 Drawing Sheet

EXPANSION TURBINE STAGE

CROSS REFERENCE TO RELATED APPLICATIONS

Applicant claims priority under 35 U.S.C. §119 of German Application No. 103 10 678.2 filed Mar. 12, 2003.

BACKGROUND OF THE INVENTION

1. Field of the Invention

The present invention relates to an expansion turbine stage for compressed gases, having a housing and a turbine rotor. The housing has flow guide channels for feeding the compressed gas to the turbine rotor. The turbine rotor is over-mounted and has centripetal flow through it. An out-flow diffuser enclosed by the housing follows the overhung turbine rotor to delay the cold expanded gas.

2. The Prior Art

Known expansion turbine stages having the characteristics described initially have drawbacks encountered in practice. At great temperature differences between the entering compressed gas and the expanded gas exiting from the turbine rotor, the effectiveness of these stages is reduced because of the heat exchange between these two gas streams, as the result of heat conduction in the turbine. In this connection, the heat transport into the out-flow diffuser from the housing is a particular problem. In this transport, the expanded gas stream is heated up, on the one hand and, at the same time, the compressed gas stream entering into the turbine rotor is cooled. The heat by-pass as described reduces the difference in enthalpy between the two streams. This reduction in turn reduces the technical work gained at the turbine rotor and thereby reduces the degree of effectiveness of the turbine. This problem is significant, in particular, in the case of very low, particularly cryogenic temperature ranges, in which turbine stages of the type being described are frequently used. For example, in the case of turbine stages in air separation plants, temperature differences of up to 150° K frequently occur between the entering stream and the exiting stream.

SUMMARY OF THE INVENTION

It is therefore an object of the present invention to increase the degree of effectiveness of -the turbine stage in an expansion turbine having the characteristics described initially.

This object is achieved, according to the invention, by arranging the out-flow diffuser in a holder bore in the housing, as a separate component. The out-flow diffuser is made from a non-metallic material having a low heat conductivity, for thermal insulation of the housing relative to the cold expanded gas stream. In this way, the heat transport between the entering and the exiting gas stream is significantly reduced. On the one hand, heating of the expanded gas is clearly weakened, so that this gas has a very low enthalpy. On the other hand, cooling of the compressed gas stream that is fed in is also clearly reduced, so that the compressed gas stream has a very high enthalpy when entering into the turbine rotor. The two gas streams therefore have a very great difference in enthalpy, which allows a correspondingly great technical work to be obtained, according to the teaching of thermodynamics. The irreversibilities caused by heat conduction in the expansion turbine stage are significantly reduced using the measure according to the invention, so that an approximation of the isentropic ideal case results. In the final analysis, the invention allows a significant increase in the degree of effectiveness of the turbine.

Preferably, the out-flow diffuser is made of a plastic having a heat conductivity of less than 2 W/(mK). According to a particularly preferred embodiment of the invention, the plastic is made of a polyolefin suitable for low-temperature applications, particularly a polyethylene or polyethylene copolymer having an ultra-high molecular weight (PE-UHMW). This plastic demonstrates sufficient impact strength and wear resistance even at cryogenic gas turbine temperatures as low as −200° C. This capability is particularly advantageous when using the turbine stage in air separation plants.

BRIEF DESCRIPTION OF THE DRAWINGS

Other objects and features of the present invention will become apparent from the following detailed description considered in connection with the accompanying drawings. It should be understood, however, that the drawing is designed for the purpose of illustration only and not as a definition of the limits of the invention.

In the drawing, the single FIGURE, FIG. 1, schematically shows a lengthwise cross-section through the expansion turbine stage according to the invention.

DETAILED DESCRIPTION OF PREFERRED EMBODIMENTS

Figure 1:
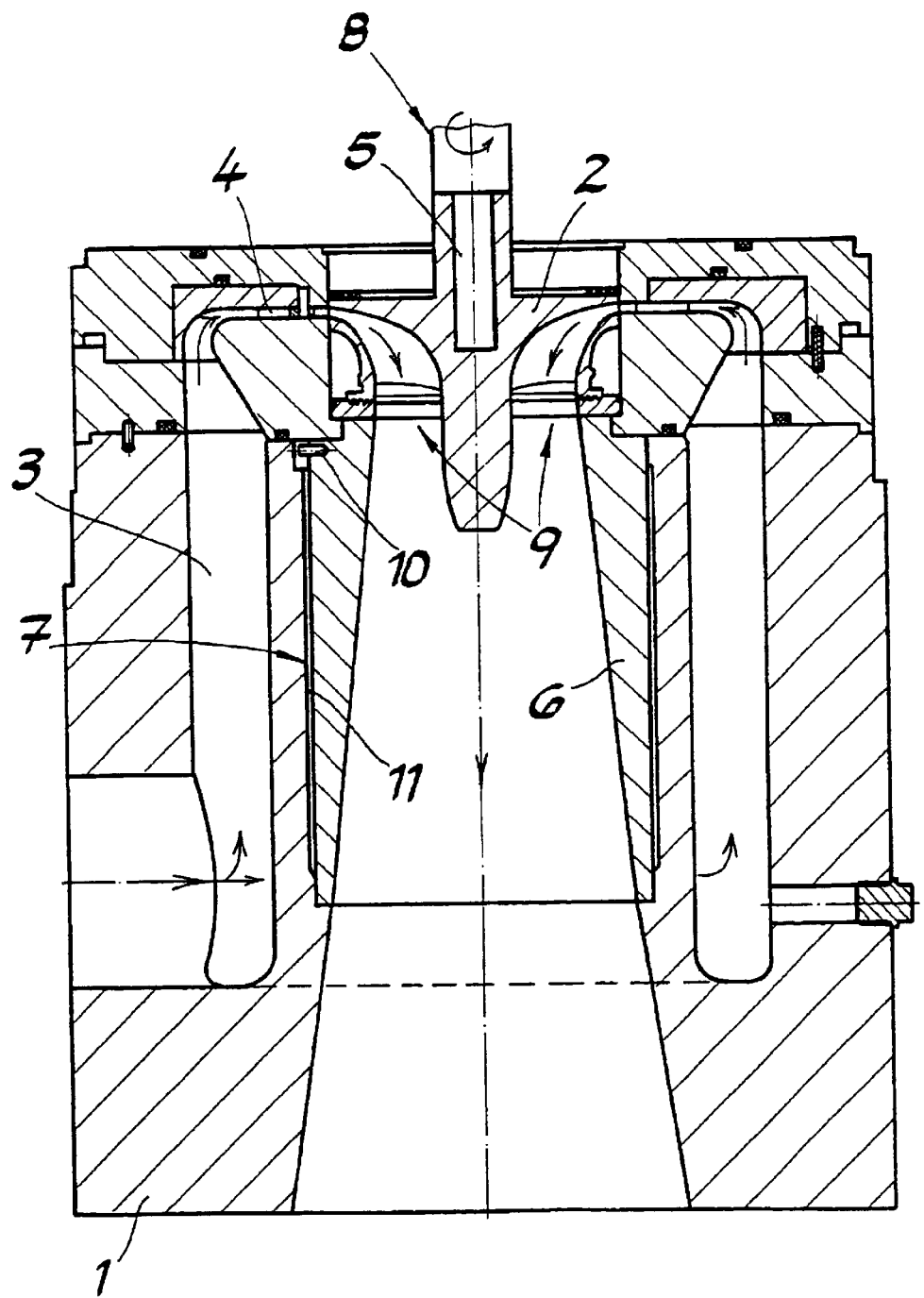

FIG. 1 shows an expansion turbine stage for compressed gases, having a housing 1 and a turbine rotor 2. Housing 1 has flow guide channels 3 and jets 4 connected to them downstream, for feed of the compressed gas to turbine rotor 2. Turbine rotor 2, arranged on a shaft end 5 in over-mounted manner, and having centripetal flow through it, is followed by an out-flow diffuser 6 enclosed by housing 1 to delay the cold expanded gas. Diffuser 6 extends coaxially to turbine rotor 2, as an extension of shaft end 5. Out-flow diffuser 6 is arranged in a holder bore 7 in housing 1, as a separate component. For thermal insulation of housing 1 relative to the cold expanded gas stream, out-flow diffuser 6 is made of a non-metallic material having a low heat conductivity. The heat transport between the entering gas stream and the exiting gas stream due to heat conduction in housing 1 and in out-flow diffuser 6 is clearly reduced thereby. On the one hand, heating of the expanded gas stream can be prevented, so that the expanded gas stream has a very low enthalpy. On the other hand, cooling of the supplied compressed gas due to heat conduction can also be precluded, to a great extent, so that this gas has a very high enthalpy when entering into turbine rotor 2. There is therefore a great difference in enthalpy between the two gas streams, which allows obtaining great technical work at the turbine shaft 8. Irreversibilities resulting from heat conduction are clearly reduced, so that the operation of the turbine stage approximates the isentropic ideal case. The turbine stage is therefore characterized by a high degree of turbine effectiveness.

Out-flow diffuser 6 is made of a polyethylene compound having an ultra-high molecular weight (PE-UHMW), which has a heat conductivity of less than 2 W/(mK). This plastic demonstrates sufficient impact resistance and wear resistance even at temperatures down to −200° C. This resistance is particularly important in the case of air separation plants, in which the expansion turbine stage as described is frequently used.

In the exemplary embodiment, out-flow diffuser 6 is rigidly connected with housing 1 only in the flow entry region 9, by way of cylinder pins 10. Relative movements between diffuser 6 and metallic housing 1 are possible. In this way, a build-up of heat stresses during cooling to the low operating temperatures can be avoided. An air gap 11 is provided between holder bore 7 and out-flow diffuser 6. In the exemplary embodiment, the contact between diffuser 6 and bore 7 is restricted to the two end regions of diffuser 6. Air gap 11 results in a further reduction of the heat transport between the entering gas stream and the exiting gas stream.

Accordingly, although only at least one embodiment of the present invention has been shown and- described, it is to be understood that many changes and modifications may be made thereunto without departing from the spirit and scope of the invention as defined in the appended claims.

What is claimed is:

1. An expansion turbine stage for compressed gases comprising:
    (a) a housing comprising a holder bore and a plurality of flow guide channels;
    (b) an overhung turbine rotor disposed within said housing, said plurality of flow guide channels being adapted to feed compressed gas to said turbine rotor for centripetal flow through said turbine rotor; and
    (c) an out-flow diffuser arranged in said holder bore, as a separate component, and enclosed by said housing downstream of said turbine rotor for delay of a cold expanded gas stream from said out-flow diffuser, said out-flow diffuser comprising a non-metallic material having a low heat conductivity relative to the cold expanded gas stream for thermal insulation of said housing, said out-flow diffuser having a flow entry region and being rigidly connected with said housing only in the flow entry region.

2. The expansion turbine stage according to claim 1, wherein said out-flow diffuser comprises a plastic having a heat conductivity of less than 2 W/(mK).

3. The expansion turbine stage according to claim 2, wherein said out-flow diffuser comprises polyolefin suitable for low-temperature applications selected from the group consisting of a polyethylene and a polyethylene copolymer having an ultra-high molecular weight (PE-UHMW).

* * * * *